United States Patent
Lo et al.

(10) Patent No.: US 10,644,996 B2
(45) Date of Patent: May 5, 2020

(54) ROUTE DETERMINING METHOD AND APPARATUS, AND COMMUNICATIONS DEVICE

(71) Applicant: Huawei Technologies Co., Ltd., Shenzhen, Guangdong (CN)

(72) Inventors: Yuan-Hsun Lo, Xiamen (CN); Wing Shing Wong, Hong Kong (CN); Yong Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/250,724

(22) Filed: Jan. 17, 2019

(65) Prior Publication Data

US 2019/0158391 A1    May 23, 2019

Related U.S. Application Data

(63) Continuation of application No. PCT/CN2017/095295, filed on Jul. 31, 2017.

(30) Foreign Application Priority Data

Aug. 10, 2016   (CN) .......................... 2016 1 0657657

(51) Int. Cl.
*H04L 12/753*       (2013.01)
*H04L 12/727*       (2013.01)
(Continued)

(52) U.S. Cl.
CPC .............. *H04L 45/48* (2013.01); *H04L 45/02* (2013.01); *H04L 45/12* (2013.01); *H04L 45/121* (2013.01)

(58) Field of Classification Search
CPC ....... H04L 45/48; H04L 45/02; H04L 45/121; H04L 45/12
See application file for complete search history.

(56) References Cited

U.S. PATENT DOCUMENTS

2004/0243621 A1*  12/2004  Ito ........................... G06F 17/10
2007/0153834 A1*  7/2007  Qu ......................... H04L 5/0007
                                                                370/478

(Continued)

FOREIGN PATENT DOCUMENTS

CN          102394782 A       3/2012
CN          102420775 A       4/2012

OTHER PUBLICATIONS

Xiaoshan Yu et al: "Enhanced fat tree—an optical/electrical hybrid interconnection for data center", Communications and Photonics Conference (ACP), 2012 Asia, IEEE, Nov. 7, 2012, pp. 1-3.

(Continued)

*Primary Examiner* — Brian D Nguyen
(74) *Attorney, Agent, or Firm* — Kilpatrick Townsend & Stockton LLP (57) ABSTRACT

A route determining method and apparatus, and a communications device are provided. The method includes: obtaining startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determining, from an n-dimensional Latin square, an element whose row is the sequence number of the startpoint edge switch and column is the sequence number of the endpoint edge switch; and if the sequence number of the startpoint POD is the same as the sequence number of the endpoint POD, determining that the required path is the startpoint edge switch, an aggregation switch corresponding to the element in the POD, and the endpoint edge switch.

10 Claims, 5 Drawing Sheets

(51) Int. Cl.
*H04L 12/721* (2013.01)
*H04L 12/751* (2013.01)

(56) References Cited

U.S. PATENT DOCUMENTS

| | | | | |
|---|---|---|---|---|
| 2009/0144799 | A1* | 6/2009 | Simske | G06F 21/606 |
| | | | | 726/1 |
| 2010/0020806 | A1 | 1/2010 | Vahdat et al. | |
| 2011/0105163 | A1* | 5/2011 | Lee | H04W 72/08 |
| | | | | 455/501 |
| 2013/0022047 | A1 | 1/2013 | Nakashima et al. | |
| 2015/0350057 | A1* | 12/2015 | Huang | H04L 45/122 |
| | | | | 370/351 |
| 2016/0255138 | A1* | 9/2016 | Akimoto | G06F 15/17387 |
| | | | | 709/217 |
| 2017/0142238 | A1* | 5/2017 | Gligoroski | H03M 13/353 |

OTHER PUBLICATIONS

Yuan-Hsun Lo et al., "The Global Packing Number of a Fat-Tree Network", IEEE Transactions on Information Theory, vol. 63, No. 8, Aug. 2017, 9 pages.

Mohammad Al-Fares et al., "Hedera: Dynamic Flow Scheduling for Data Center Networks", In Proc. of Networked Systems Design and Implementation (NSDI) Symposium, 2010, 15 pages.

* cited by examiner

ROUTE DETERMINING METHOD AND APPARATUS, AND COMMUNICATIONS DEVICE

CROSS-REFERENCE TO RELATED APPLICATIONS

This application is a continuation of International Application No. PCT/CN2017/095295, filed on Jul. 31, 2017, which claims priority to Chinese Patent Application No. 201610657657.4, filed on Aug. 10, 2016. The disclosures of the aforementioned applications are hereby incorporated by reference in their entireties.

TECHNICAL FIELD

The present application relates to the field of communications technologies, and in particular, to a route determining method and apparatus, and a communications device.

BACKGROUND

With development of network technologies, a datacenter has become an infrastructure that provides an Internet service, distributed parallel computing, and the like. Designing an expendable network architecture and an efficient routing algorithm for the datacenter is a research focus in a current academic circle. At the present stage, researchers put forward, based on different rules, a lot of topologies used to construct a datacenter network. A fat-tree topology has been widely applied to the datacenter. A topology rule for constructing a fat-tree network is as follows: In an n-element fat-tree topology, that is, an n-layer fat-tree topology, when n is 3, an entire topology network is divided into three layers that are respectively an edge layer, an aggregation layer, and a core layer from bottom to top. A performance optimization datacenter (Pod) includes switches at the aggregation layer and switches at the edge layer. The entire topology network includes 2n PODs, each POD is connected to $n^2$ hosts (hosts or servers), each POD has n switches at the aggregation layer and n switches at the edge layer, and there are $n^2$ switches at the core layer. Each switch has 2n ports. The network can support $(2n)^3/4$ hosts in total.

Roughly, in the prior art, there are two routing solutions that are based on a fat-tree network. One is convention-based equal-cost multi-path routing (ECMP), that is, there are multiple equal-cost paths between each two switches at the edge layer or each two hosts, and then, packet header information is analyzed, and one of the paths is selected by applying a result of a hash function, so as to implement multi-path load balancing. The other is dynamic routing in which adjusting is performed based on a network traffic. For example, a path is dynamically selected according to a current network status and estimation of a data traffic.

However, neither of the two routing solutions can completely avoid a queuing delay caused by path overlap in a network. Because a link has limited bandwidth and can be used to process only a specific data volume each time, if all data flows pass through a same link, some data flows need to queue. Consequently, a transmission time delay is caused. In the ECMP or the dynamic routing, path overlap is not absolutely avoided in a path selection rule. For example, the ECMP may be approximately considered as randomly selecting a path, and therefore a probability that two selected paths overlap is greater than 0.

SUMMARY

Embodiments of the present application provide a route determining method and apparatus, and a communications device, so as to resolve a prior-art technical problem of a relatively long queuing delay caused by path overlap in a datacenter network.

According to a first aspect, an embodiment of the present application provides a route determining method, including: obtaining startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determining, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determining that the required path is the startpoint edge switch, an aggregation switch corresponding to the element in the POD, and the endpoint edge switch.

According to the method in this embodiment of the present application, data flows are evenly distributed on all paths, so as to implement load balancing and avoid a prior-art problem of a relatively long queuing delay caused by path overlap.

With reference to the first aspect, in a first possible implementation of the first aspect, the method further includes:

if the sequence number of the startpoint POD is different from the sequence number of the endpoint POD, determining one of core switches connected to the aggregation switch corresponding to the element, where different startpoint edge switches in a same POD are corresponding to different core switches; and determining that the required path is the startpoint edge switch, the aggregation switch corresponding to the element in the POD, the one of the core switches connected to the aggregation switch, an aggregation switch connected to the core switch in the endpoint POD, and the endpoint edge switch.

With reference to the first possible implementation of the first aspect, in a second possible implementation of the first aspect, the determining one of core switches connected to the aggregation switch corresponding to the element includes: determining, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

With reference to the first aspect, the first possible implementation of the first aspect, or the second possible implementation of the first aspect, in a third possible implementation of the first aspect, if a data flow is from the startpoint edge switch to the endpoint switch, the method further includes: determining, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determining that an optical carrier corresponding to the wavelength element is an optical carrier used for the required path. By using the method, one optical carrier can be allocated between each two edge switches by using fewest optical carriers.

With reference to the first aspect, the first possible implementation of the first aspect, or the second possible implementation of the first aspect, in a fourth possible implementation of the first aspect, if a data flow is from a startpoint host connected to the startpoint edge switch to an endpoint host connected to the endpoint edge switch, the method further includes: determining, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determining that an optical carrier corresponding to the wavelength element is an optical carrier used for the required path. By using the method, one optical carrier can be allocated between each two hosts by using fewest optical carriers.

According to a second aspect, an embodiment of the present application provides a communications device, including:

a port, configured to transmit/receive a packet; and a processor, configured to: obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determine that the required path is the startpoint edge switch, an aggregation switch corresponding to the element in the POD, and the endpoint edge switch.

With reference to the second aspect, in a first possible implementation of the second aspect, the processor is further configured to: if the sequence number of the startpoint POD is different from the sequence number of the endpoint POD, determine one of core switches connected to the aggregation switch corresponding to the element, where different startpoint edge switches in a same POD are corresponding to different core switches; and determine that the required path is the startpoint edge switch, the aggregation switch corresponding to the element in the POD, the one of the core switches connected to the aggregation switch, an aggregation switch connected to the core switch in the endpoint POD, and the endpoint edge switch.

With reference to the first possible implementation of the second aspect, in a second possible implementation of the second aspect, the processor is configured to determine, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

With reference to the second aspect, the first possible implementation of the second aspect, or the second possible implementation of the second aspect, in a third possible implementation of the second aspect, the processor is further configured to: if a data flow is from the startpoint edge switch to the endpoint switch, determine, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determine that an optical carrier corresponding to the wavelength element is an optical carrier used for the required path.

With reference to the second aspect, the first possible implementation of the second aspect, or the second possible implementation of the second aspect, in a fourth possible implementation of the second aspect, the processor is further configured to: if a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determine that an optical carrier corresponding to the wavelength element is an optical carrier used for the required path.

According to a third aspect, an embodiment of the present application provides a communications device, including:

a processor, configured to: obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determine that the required path is the startpoint edge switch, an aggregation switch corresponding to the element in the POD, and the endpoint edge switch; and a transmitter, configured to send the required path to a switch at each layer in a datacenter network.

With reference to the third aspect, in a first possible implementation of the third aspect, the processor is further configured to: if the sequence number of the startpoint POD is different from the sequence number of the endpoint POD, determine one of core switches connected to the aggregation switch corresponding to the element, where different startpoint edge switches in a same POD are corresponding to different core switches; and determine that the required path is the startpoint edge switch, the aggregation switch corresponding to the element in the POD, the one of the core switches connected to the aggregation switch, an aggregation switch connected to the core switch in the endpoint POD, and the endpoint edge switch.

With reference to the first possible implementation of the third aspect, in a second possible implementation of the third aspect, the processor is configured to determine, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

With reference to the first possible implementation of the third aspect or the second possible implementation of the third aspect, in a third possible implementation of the third aspect, the processor is further configured to: if a data flow is from the startpoint edge switch to the endpoint switch, determine, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determine that an optical carrier corresponding to the wavelength element is an optical carrier used for the required path.

With reference to the first possible implementation of the third aspect or the second possible implementation of the third aspect, in a fourth possible implementation of the third aspect, the processor is further configured to: if a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determine that an optical carrier corresponding to the wavelength element is an optical carrier used for the required path.

According to a fourth aspect, an embodiment of the present application provides a route determining apparatus, where the apparatus includes function modules configured to implement the method in the first aspect.

According to a fifth aspect, an embodiment of the present application further provides a computer storage medium, where the computer storage medium stores program code, and the program code includes an instruction used to implement any possible implementation of the method in the first aspect.

DESCRIPTION OF EMBODIMENTS

Embodiments of the present application provide a route determining method and apparatus, and a communications device, so as to resolve a prior-art technical problem of a relatively long queuing delay caused by path overlap in a datacenter network.

The following describes in detail implementation processes and objectives of the solutions in the embodiments of the present application.

Figure 1:
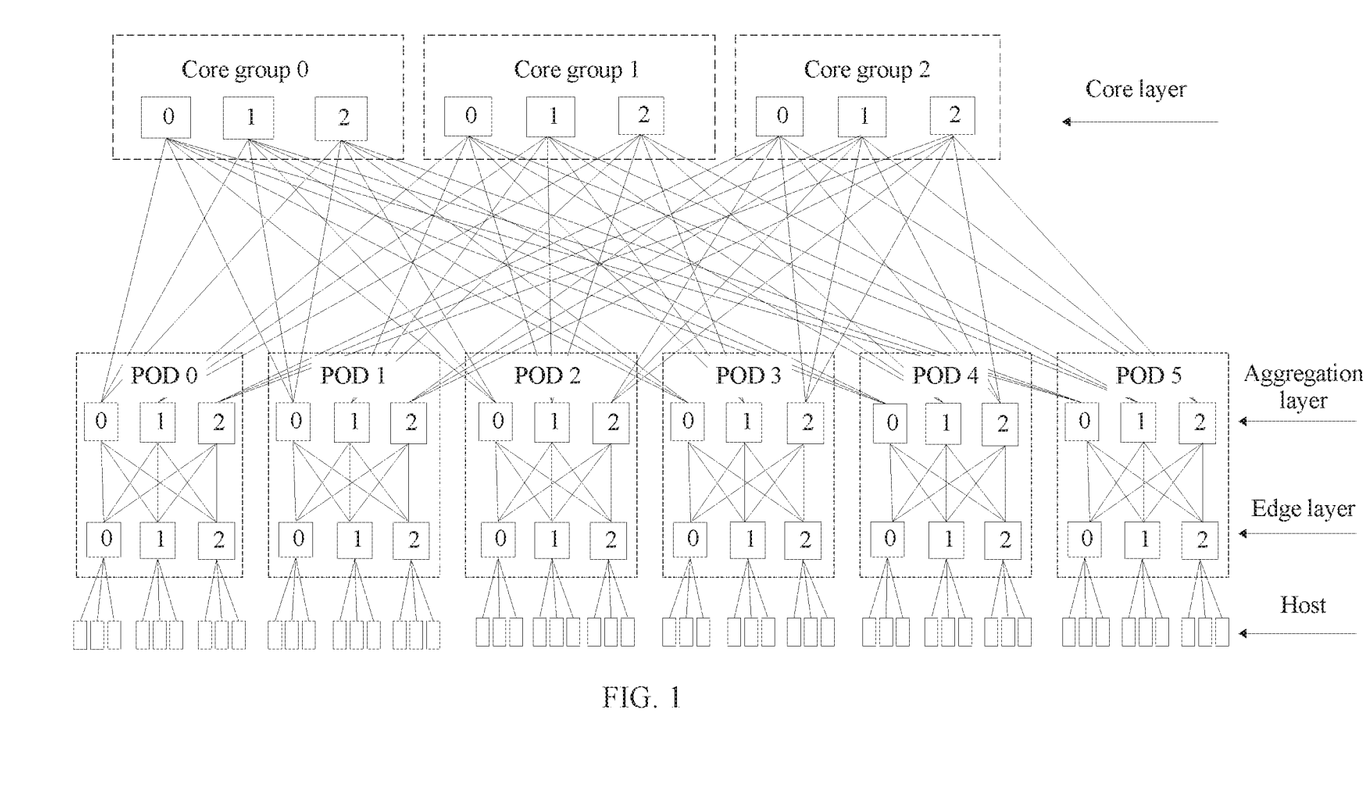
FIG. 1 is a structural diagram of a datacenter network according to an embodiment of the present application.

An embodiment of the present application provides a route determining method, and the method may be applied to a datacenter network. Referring to FIG. 1, FIG. 1 is a structural diagram of a datacenter network that is based on a three-element fat-tree topology. As shown in FIG. 1, the network is divided into three layers from top to bottom, that is, n is 3. The three layers from top to bottom are a core layer, an aggregation layer, and an edge layer. A switch at the core layer is referred to as a core switch, a switch at the aggregation layer is referred to as an aggregation switch, and a switch at the edge layer is referred to as an edge switch. A host is directly connected to an edge switch. During actual application, devices distributed at the three layers may be other data forwarding devices, such as routers, and are collectively referred to as switches in this specification for ease of description.

An n-element fat-tree network includes 2n PODs, and each switch has 2n ports. Therefore, in this embodiment, a datacenter network in which n is 3 includes six PODs, each POD has three edge switches and three aggregation switches, and a core layer has three core groups that are a core group 0 to a core group 2. Each core group has three core switches. Each Pod is connected to $n^2$ hosts, that is, nine hosts, and the network can support $(2n)^3/4$ hosts, that is, 54 hosts, in total. Each switch has six ports. Six ports of one aggregation switch in each POD are connected to three core switches in one core group and are connected to three edge switches in the same POD. Each aggregation switch is connected to a different core group. Six ports of each edge switch are connected to three aggregation switches in a same POD and three hosts. For example, as shown in FIG. 1, an aggregation switch 0 in a POD 0 is connected to three core switches in a core group 0 and is connected to three edge switches in the POD 0; an aggregation switch 1 in the POD 0 is connected to three core switches in a core group 1 and is connected to the three edge switches in the POD 0; and an aggregation switch 2 in the POD 0 is connected to three core switches in a core group 2 and is connected to the three edge switches in the POD 0. A connection case of a switch in another POD is similar. Details are not described herein.

In FIG. 1, a POD 0 to a POD 6 indicate numbers of PODs. During actual application, different PODs may be identified by using other identifiers. Numbers 0 to 2 of switches at the core layer are used to uniquely identify core switches in a same core group. Similarly, numbers 0 to 2 of switches at the aggregation layer are used to uniquely identify aggregation switches in a same POD, and numbers 0 to 2 of switches at the edge layer are used to uniquely identify edge switches in a same POD. During actual application, aggregation switches or edge switches in a same POD may be identified by using other identifiers.

Optionally, the datacenter network may further include a controller (not shown in the figure). The controller may be configured to determine a path.

Optionally, a startpoint edge switch may determine a path.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Some technical terms in this specification such as terms in the existing datacenter network are used to describe the embodiments of the present application, and may vary with evolution of the network. For specific evolution, refer to descriptions in corresponding standards.

Figure 2:
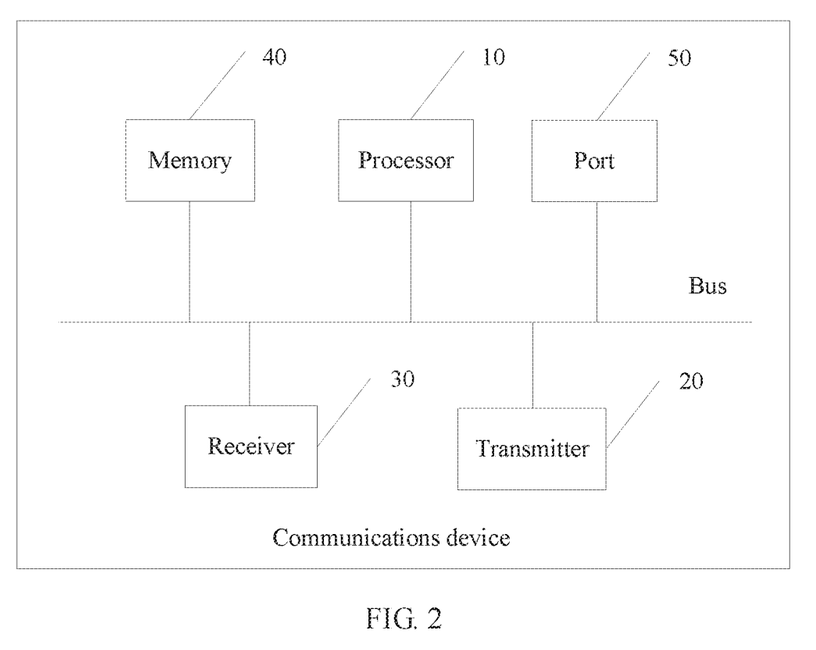
FIG. 2 is a structural diagram of a communications device according to an embodiment of the present application.

Next, referring to FIG. 2, FIG. 2 is a possible structural diagram of a communications device according to an embodiment of the present application. The communications device is, for example, the foregoing switch, host, or controller. As shown in FIG. 2, the communications device includes a processor 10, a transmitter 20, a receiver 30, a memory 40, and a port 50. The memory 40, the transmitter 20, the receiver 30, and the processor 10 may be connected by using a bus. Certainly, during actual application, the memory 40, the transmitter 20, the receiver 30, and the processor 10 may not be of a bus structure, but another structure, such as a star structure. This is not specifically limited in this application.

Optionally, the processor 10 may be specifically a general-purpose central processing unit or an application-specific integrated circuit (ASIC), or may be one or more integrated circuits used to control program execution, or may be a hardware circuit developed by using a field programmable gate array (FPGA f), or may be a baseband processor.

Optionally, the processor 10 may include at least one processing core.

Optionally, the memory 40 may include one or more of a read-only memory (ROM), a random access memory (RAM), or a magnetic disk storage. The memory 40 is configured to store data and/or an instruction that is/are required when the processor 10 runs. There may be one or more memories 40.

Optionally, the transmitter 20 and the receiver 30 may be physically independent of each other, or may be physically integrated together. The transmitter 20 may send data by using the port 50. The receiver 30 may receive data by using the port 50.

Optionally, if the communications device is a switch, there are 2n ports 50; or if the communications device is a host, there are n ports 50.

Figure 3:
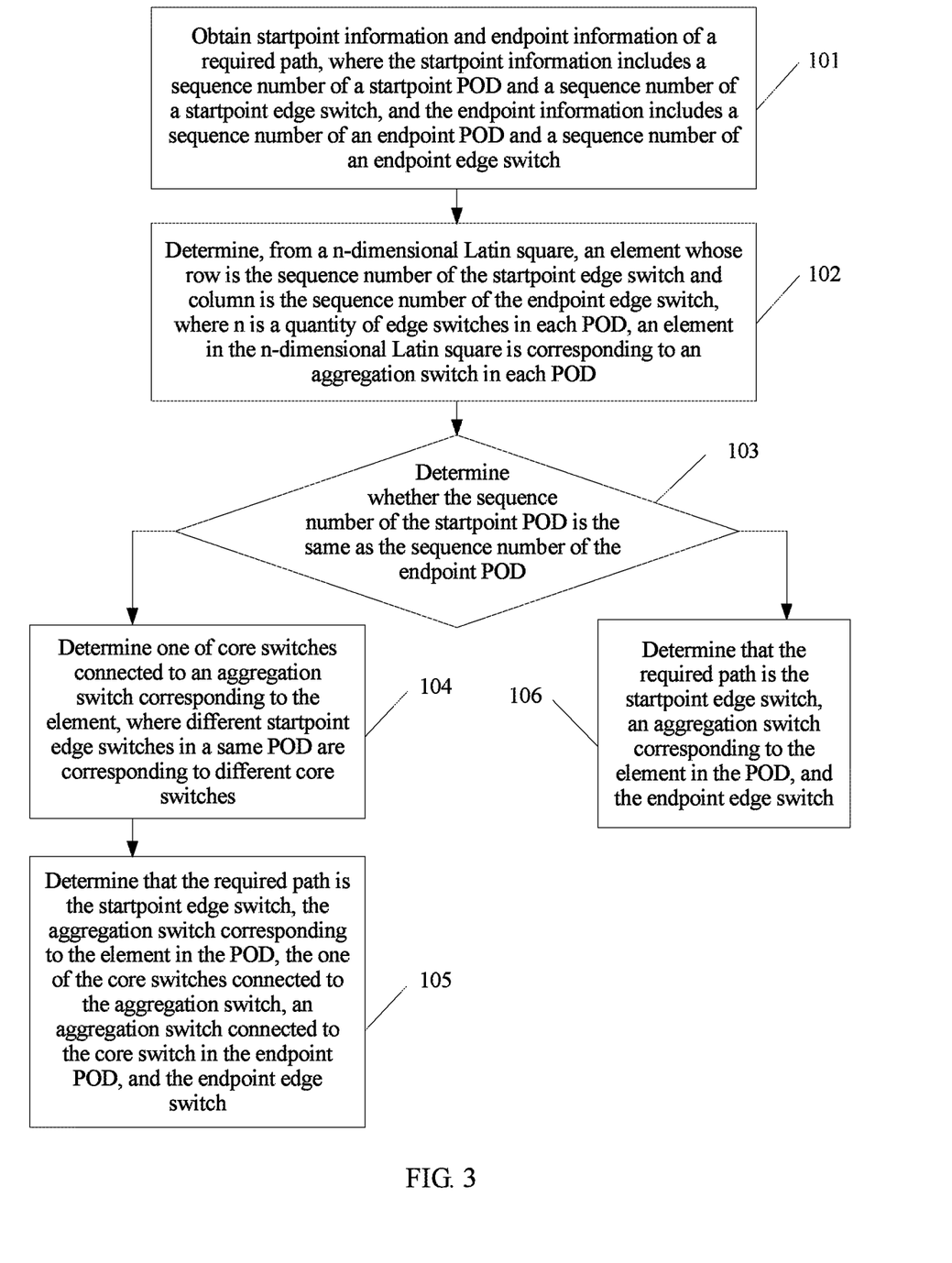
FIG. 3 is a flowchart of a route determining method according to an embodiment of the present application.

Next, referring to FIG. 3, FIG. 3 is a flowchart of a route determining method according to an embodiment of the present application. Referring to both FIG. 1 and FIG. 3, the method includes the following operations:

Operation 101: Obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch.

Operation 102: Determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2.

Operation 103: Determine whether the sequence number of the startpoint POD is the same as the sequence number of the endpoint POD.

Operation 104: If the sequence number of the startpoint POD is different from the sequence number of the endpoint POD, determine one of core switches connected to an aggregation switch corresponding to the element, where different startpoint edge switches in a same POD are corresponding to different core switches.

Operation 105: Determine that the required path is the startpoint edge switch, the aggregation switch corresponding to the element in the POD, the one of the core switches connected to the aggregation switch, an aggregation switch connected to the core switch in the endpoint POD, and the endpoint edge switch.

Operation 106: If the sequence number of the startpoint POD is the same as the sequence number of the endpoint POD, determine that the required path is the startpoint edge switch, an aggregation switch corresponding to the element in the POD, and the endpoint edge switch.

Optionally, operation 101 may be: when receiving a packet, an edge switch parses packet header information of the packet to obtain startpoint information and endpoint information of the packet. A path between the startpoint information and the endpoint information is a required path.

Optionally, the startpoint information includes a sequence number of a startpoint POD and a sequence number of a startpoint edge switch, and the endpoint information includes a sequence number of an endpoint POD and a sequence number of an endpoint edge switch. For example, $P_{(t,i)(t',i')}$ indicates a required path, a startpoint is an $i^{th}$ edge switch in a $t^{th}$ POD, and an endpoint is an $i^{th}$ edge switch in a $i^{th}$ POD. As shown in FIG. 1, for example, t is 1 and i is 1, that is, for example, an identifier of a startpoint POD is a number 0 and an identifier of a startpoint edge switch is a number 0. In other words, the startpoint of the required path is an edge switch 0 in a POD 0.

The n-dimensional Latin square is an n×n square, and the square has exactly n types of diffident elements. Each type has exactly n elements, and each type of element occurs exactly once in one row or one column. A unipotent Latin square is a special Latin square whose diagonal elements need to be consistent. In a diagonally-vacant square, no element is placed on a diagonal, and an element does not repeatedly appear in each row or each column. For example, n is 4. Referring to Table a to Table d, Table a to Table d are respectively a common Latin square, a unipotent Latin square, and diagonally-vacant square matrices.

TABLE a

| 0 | 2 | 1 | 3 |
| 1 | 3 | 2 | 0 |
| 2 | 0 | 3 | 1 |
| 3 | 1 | 0 | 2 |

TABLE b

| 0 | 1 | 2 | 3 |
| 3 | 0 | 1 | 2 |
| 2 | 3 | 0 | 1 |
| 1 | 2 | 3 | 0 |

TABLE c

|   | 1 | 2 | 3 |
|---|---|---|---|
| 3 |   | 1 | 2 |
| 2 | 3 |   | 1 |
| 1 | 2 | 3 |   |

TABLE d

|   | 1 | 0 | 3 |
|---|---|---|---|
| 2 |   | 1 | 0 |
| 3 | 0 |   | 2 |
| 1 | 2 | 3 |   |

The datacenter network shown in FIG. 1 is in a three-element fat-tree structure, that is, n is 3. Therefore, the Latin square in this embodiment of the present application is a three-dimensional Latin square, that is, n is a quantity of edge switches or aggregation switches in each POD.

Further, in the Latin square in this embodiment of the present application, an element in the Latin square is corresponding to an aggregation switch in each POD. Optionally, each element is corresponding to a number in each POD. Optionally, the element in the Latin square may be a number of the aggregation switch in each POD. For example, in FIG. 1, numbers of aggregation switches in the POD 0 are 0, 1, and 2, and therefore, the Latin square may be shown in Table e or Table f.

TABLE e

|   | 1 | 0 |
|---|---|---|
| 2 |   | 1 |
| 1 | 0 |   |

TABLE f

| 0 | 1 | 2 |
|---|---|---|
| 1 | 2 | 0 |
| 2 | 0 | 1 |

Optionally, the element in the Latin square may be different from but corresponding to a number of the aggregation switch in each POD. For example, elements in the Latin square may be 3, 4, and 5 that respectively represent an aggregation switch 0, an aggregation switch 1, and an aggregation switch 2.

In this embodiment of the present application, the aggregation switch is determined by using the n-dimensional Latin square. Specifically, the element whose row is the sequence number of the startpoint edge switch and column is the sequence number of the endpoint edge switch is determined from the n-dimensional Latin square. For example, if the sequence number of the startpoint edge switch is i, and the sequence number of the endpoint edge switch is i', an element dii' whose row is the sequence number i of the startpoint edge switch and column is the sequence number i' of the endpoint edge switch is determined from the n-dimensional Latin square. For example, if the sequence number of the startpoint edge switch is 1, and the sequence number of the endpoint edge switch is 2, an element 1 whose row is 1 and column is 2 is determined from the Latin square shown in Table f, and the element 1 represents that the determined aggregation switch is an aggregation switch 1 in a POD t.

During selection of a path from an edge switch to an edge switch, a startpoint edge switch and an endpoint edge switch may be in a same POD. In this case, only an aggregation switch needs to be determined, while a core switch does not need to be further determined. If a startpoint edge switch and an endpoint switch are not in a same POD, in addition to an aggregation switch, a core switch needs to be further determined. Therefore, after operation 101, operation 103 is further performed, that is, it is determined whether the sequence number of the startpoint POD is the same as the sequence number of the endpoint POD, so as to determine whether the startpoint edge switch and the endpoint edge switch are in a same POD. For example, if t is 1 and t' is 1, it indicates that the startpoint edge switch and the endpoint edge switch are in a same POD, such as a POD 0. For another example, if t is 1 and t' is 2, it indicates that the startpoint edge switch and the endpoint edge switch are in different PODs.

It should be noted that a sequence of performing operation 103 and operation 102 is not limited, that is, operation 102 may be first performed, or operation 103 may be first performed, or operation 103 and operation 102 may be simultaneously performed. In addition, regardless of whether operation 102 is first performed or operation 103 is first performed, the n-dimensional Latin square used in operation 102 may be the Latin square shown in Table a or Table b. If operation 103 is first performed, different types of Latin square matrices may be used in operation 102 according to different determining results of operation 103. For example, if the startpoint edge switch and the endpoint edge switch are in a same POD, a diagonally-vacant Latin square may be used. Because in a same POD, a startpoint edge switch and an endpoint edge switch are different, and dii' is not on a diagonal, whether there is an element on the diagonal has no effect on a result of determining an aggregation switch. If the startpoint edge switch and the endpoint edge switch are in different PODs, the sequence number of the startpoint edge switch may be the same as the sequence number of the endpoint edge switch. For example, if the startpoint edge switch is an edge switch 1 in a POD 0, and the endpoint edge switch is an edge switch 1 in a POD 1, dii' may be on a diagonal. Therefore, a Latin square used in this case needs to be a diagonally-occupied Latin square shown in Table a or Table b.

If the sequence number of the startpoint POD is the same as the sequence number of the endpoint POD, operation 106 is performed, that is, it is determined that the required path is the startpoint edge switch, the aggregation switch corresponding to the element in the POD, and the endpoint edge switch.

Figure 4A:
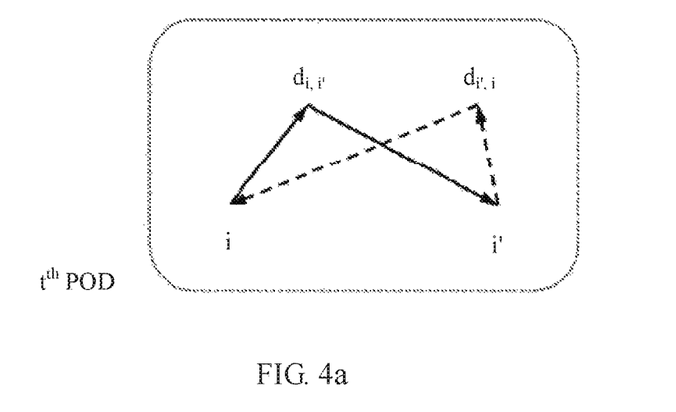
FIG. 4*a* and FIG. 4*b* are schematic diagrams of paths according to an embodiment of the present application.

For example, as shown in FIG. 4a, if $e_{t,i}$ indicates the startpoint edge switch, $e_{t,i'}$ indicates the endpoint edge switch, and $a_{t,dii'}$ indicates the aggregation switch determined in operation 102, the required path is $P_{(t,i)(t',i')} := e_{t,i} \rightarrow a_{t,d_{ii'}} \rightarrow e_{t,i'}$.

In FIG. 4a, a solid line indicates a path from the startpoint edge switch i to the endpoint edge switch i', and a dashed line indicates a path from the endpoint edge switch i' to the startpoint edge switch i. A difference is that on the path indicated by the solid line, the aggregation switch is specified by dii', while on the path indicated by the dashed line, an aggregation switch is specified by di'i.

With reference to FIG. 1, for example, if the sequence number of the startpoint edge switch is 1, the sequence number of the endpoint edge switch is 2, and both the startpoint edge switch and the endpoint edge switch are in the POD 0, an element 1 whose row is 1 and column is 2 is determined from the Latin square shown in Table e, and the element 1 represents that the determined aggregation switch is an aggregation switch 1 in the POD 0. Therefore, the required path is the edge switch 0 in the POD 0, the aggregation switch 1 in the POD 0, and the edge switch 1 in the POD 0.

If the sequence number of the startpoint POD is different from the sequence number of the endpoint POD, operation 104 and operation 105 are performed, that is, the one of the core switches connected to the aggregation switch corresponding to the element is determined, and it is determined that the required path is the startpoint edge switch, the aggregation switch corresponding to the element in the POD, any core switch connected to the aggregation switch, the aggregation switch connected to the core switch in the endpoint POD, and the endpoint edge switch. Different startpoint edge switches in a same POD are corresponding to different core switches. For example, referring to FIG. 1 and assuming that the sequence number of the startpoint edge switch in the POD 0 is 0, and the aggregation switch determined in operation 102 is an aggregation switch indicated by a sequence number 1, one of three core switches in a core group 1 connected to the aggregation switch 1, for example, a core switch 0 in the core group 1, may be selected in operation 104. If the sequence number of the startpoint edge switch is 1, a core switch 1 in the core group 1 connected to the aggregation switch 1 may be selected in operation 104. If the sequence number of the startpoint edge switch is 2, a core switch 2 in the core group 1 connected to the aggregation switch 1 may be selected in operation 104. Certainly, when the sequence number of the startpoint edge switch is 0, the core switch 1 in the core group 1 connected to the aggregation switch 1 may be selected in operation 104; when the sequence number of the startpoint edge switch is 1, the core switch 2 in the core group 1 connected to the aggregation switch 1 may be selected in operation 104; or when the sequence number of the startpoint edge switch is 2, the core switch 0 in the core group 1 connected to the aggregation switch 1 may be selected in operation 104.

Therefore, for ease of determining a core switch, the core switch may be determined by using an arrangement vector in operation 104. Elements in the arrangement vector are different from each other, and each element indicates a core switch in a core group. For example, the arrangement vector may be indicated as, $\pi=(\pi_1, \pi_2, \ldots, \pi_n)$, and therefore, an $i^{th}$ element $\pi_i$ is determined from the arrangement vector in operation 104, and a core switch corresponding to the $i^{th}$ element $\pi_i$ is the determined core switch.

In the example shown in FIG. 1, n is 3, and $\pi=(0, 1, 2)$. It is assumed that the startpoint edge switch is the edge switch 0 in the POD 0, and the aggregation switch determined in operation 102 is the aggregation switch 1 in the POD 0. Therefore, the first element 0 is determined from the arrangement vector in operation 104, and a core switch 0 corresponding to the element 0 is the core switch determined this time.

Figure 4B:
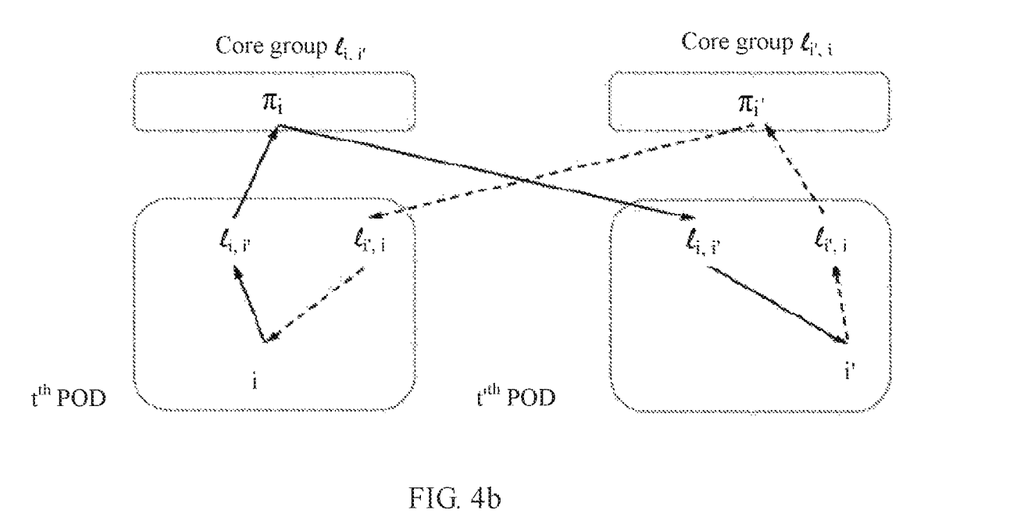

For example, referring to FIG. 4b, if $e_{t,i}$ indicates the startpoint edge switch; $e_{t',i'}$ indicates the endpoint edge switch; $a_{t/ii'}$ indicates the aggregation switch determined in operation 102; lii' is used herein to indicate an element determined from a Latin square and is used to specially explain that a common Latin square is used herein, while the foregoing dii' indicates an element determined from a diagonally-vacant Latin square; $c_{lii',\pi_i}$ indicates a core switch corresponding to an identifier $\pi_i$ in a core group $c_{lii'}$; and $a_{t'/ii'}$ indicates an aggregation switch corresponding to the element lii' in a $t'^{th}$ POD, the required path is $$P_{(t,i)(t',i')} := e_{t,i} \rightarrow a_{t,i_{i,i'}} \rightarrow c_{l_{i,i'},\pi_i} \rightarrow a_{t',l_{i,i'}} \rightarrow e_{t',i'}$$

In FIG. 4b, a solid line indicates a path from the startpoint edge switch i to the endpoint edge switch i', and a dashed line indicates a path from the endpoint edge switch i' to the startpoint edge switch i. A difference is that on the path indicated by the solid line, the aggregation switch and the core group are specified by lii', and the core switch is specified by $\pi_i$, while on the path indicated by the dashed line, an aggregation switch and a core group are specified by li'i, and a core switch is specified by $\pi_{i'}$.

With reference to FIG. 1, for example, if the sequence number of the startpoint edge switch is 1, the sequence number of the endpoint edge switch is 2, the startpoint edge switch is in the POD 0, and the endpoint edge switch is in the POD 1, an element 1 whose row is 1 and column is 2 is determined from the Latin square shown in Table f, and the element 1 represents that the determined aggregation switch is the aggregation switch 1 in the POD 0. Then, the core switch 0 in the core group 1 is determined, and then an aggregation switch 1 connected to the core switch 0 in the POD 1 is further determined. Therefore, the required path is the edge switch 0 in the POD 0, the aggregation switch 1 in the POD 0, the core switch 0 in the core group 1, the aggregation switch 1 in the POD 1, and the edge switch 1 in the POD 1.

It can be learned from the foregoing descriptions that by using the path determined according to the method in this embodiment of the present application, all links between switches at each two layers are used at same frequency, so that data flows are evenly distributed on all links in the network, and load balancing is implemented. Therefore, a technical problem of a relatively long queuing delay caused by path overlap brought by the method in the prior art is avoided.

Optionally, a control device may previously determine a route according to the method in this embodiment of the present application, and finally, a routing table is formed. Then, each switch may forward a packet by querying the routing table.

Optionally, a startpoint edge switch may determine a route according to the method in this embodiment of the present application, and after the determining, the startpoint edge switch forwards routing information together with a packet to a determined aggregation switch. Then, the aggregation switch forwards the packet according to the routing information, and further forwards the routing information to a next switch that is to perform forwarding. By analogy, forwarding continues until the packet reaches an endpoint edge switch.

Further, if a dense wavelength division multiplexing (DWDM) technology is used in the datacenter network, one optical carrier needs to be allocated between any two edge switches (or hosts). The following describes how to allocate an optical carrier to minimize a quantity of optical carriers.

Optionally, if a data flow is from an edge switch to an edge switch, because there are 2n PODs, an element Ktt' that is an element whose row is t and column is t' is determined from a 2n-dimensional Latin square K whose diagonal elements are the same, and a wavelength of an optical carrier used from the startpoint edge switch i to the endpoint edge switch i' is a wavelength corresponding to the element Ktt'. Therefore, the entire network needs 2n optical carriers. Elements in the 2n-dimensional Latin square whose diagonal elements are the same are corresponding to 2n optical carriers with different optical wavelengths. If a data flow in a same POD is not considered, only 2n−1 optical carriers with different wavelengths are needed.

Optionally, if a data flow is from a host to a host, because an edge switch connected to a host is fixed, in a path determining process, only a path from a startpoint edge switch connected to a startpoint host to an endpoint edge switch connected to an endpoint host needs to be further determined. In addition, determining of the path from the startpoint edge switch to the endpoint edge switch is the same as that in the foregoing descriptions, and therefore is not described herein again.

Optionally, if a data flow is from a host to a host, an element Qtt' that is an element whose row is t and column is t' is determined from a $2n^3$-dimensional Latin square Q whose diagonal elements are the same, and a wavelength of an optical carrier used from a startpoint host connected to the startpoint edge switch i to an endpoint host connected to the endpoint edge switch i' is a wavelength corresponding to the element Qtt'. Because there is no data flow from a host to the host, the entire network needs $2n^3-1$ optical carriers. Elements in the $2n^3$-dimensional Latin square whose diagonal elements are the same are corresponding to $2n^3-1$ optical carriers with different optical wavelengths.

Optionally, if a time division multiplexing (TDM) technology is used in the datacenter network, a time slot needs to be allocated between any two edge switches (or hosts). The following describes how to allocate a time slot.

Optionally, if a data flow is from an edge switch to an edge switch, because there are 2n PODs, an element Ktt' that is an element whose row is t and column is t' is determined from a 2n-dimensional Latin square K whose diagonal elements are the same, and a time slot used from the startpoint edge switch i to the endpoint edge switch i' is a time slot corresponding to the element Ktt'. Therefore, the entire network needs 2n time slots. Elements in the 2n-dimensional Latin square whose diagonal elements are the same are corresponding to 2n different time slots.

Optionally, if a data flow is from a host to a host, an element Qtt' that is an element whose row is t and column is t' is determined from a $2n^3$-dimensional Latin square Q whose diagonal elements are the same, and a time slot used from a startpoint host connected to the startpoint edge switch i to an endpoint host connected to the endpoint edge switch i' is a time slot corresponding to the element Qtt'. Because there is no data flow from a host to the host, the entire network needs $2n^3-1$ time slots. Elements in the $2n^3$-dimensional Latin square whose diagonal elements are the same are corresponding to $2n^3-1$ different time slots.

Based on a same application concept, an embodiment of the present application further provides a communications device (shown in FIG. 2). The communications device is configured to implement any one of the foregoing methods.

When the communications device is a controller, a processor 10 is configured to: obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determine that the required path is the startpoint edge switch, an aggregation switch corresponding to the element in the POD, and the endpoint edge switch; and a transmitter 20 is configured to send the required path to a switch at each layer in a datacenter network.

Optionally, the processor 10 is further configured to: if the sequence number of the startpoint POD is different from the sequence number of the endpoint POD, determine one of core switches connected to the aggregation switch corresponding to the element, where different startpoint edge switches in a same POD are corresponding to different core switches; and determine that the required path is the startpoint edge switch, the aggregation switch corresponding to the element in the POD, the one of the core switches connected to the aggregation switch, an aggregation switch connected to the core switch in the endpoint POD, and the endpoint edge switch.

Optionally, the processor 10 is configured to determine, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

Optionally, the processor 10 is further configured to: if a data flow is from the startpoint edge switch to the endpoint switch, determine, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determine that an optical carrier corresponding to the wavelength element is an optical carrier used for the required path.

Optionally, the processor 10 is further configured to: if a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determine that an optical carrier corresponding to the wavelength element is an optical carrier used for the required path.

When the communications device is an edge switch, a port 50 is configured to transmit/receive a packet; and a processor 10 is configured to: obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch; determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determine that the required path is the startpoint edge switch, an aggregation switch corresponding to the element in the POD, and the endpoint edge switch.

Optionally, the processor 10 is further configured to: if the sequence number of the startpoint POD is different from the sequence number of the endpoint POD, determine one of core switches connected to the aggregation switch corresponding to the element, where different startpoint edge switches in a same POD are corresponding to different core switches; and determine that the required path is the startpoint edge switch, the aggregation switch corresponding to the element in the POD, the one of the core switches connected to the aggregation switch, an aggregation switch connected to the core switch in the endpoint POD, and the endpoint edge switch.

Optionally, the processor 10 is configured to determine, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

Optionally, the processor 10 is further configured to: if a data flow is from the startpoint edge switch to the endpoint switch, determine, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determine that an optical carrier corresponding to the wavelength element is an optical carrier used for the required path.

Optionally, the processor 10 is further configured to: if a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determine that an optical carrier corresponding to the wavelength element is an optical carrier used for the required path.

Figure 5:
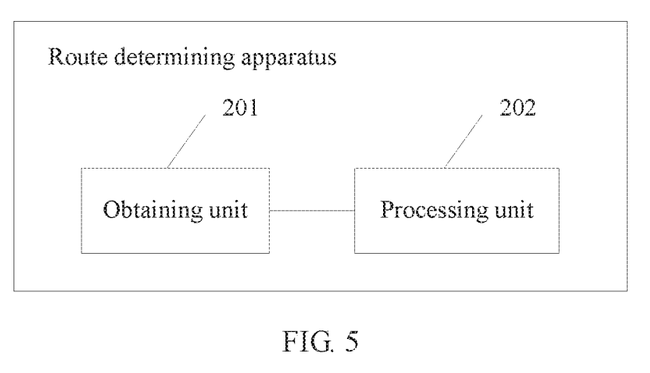
FIG. 5 is a functional block diagram of a route determining apparatus according to an embodiment of the present application.

Based on a same application concept, an embodiment of the present application further provides a route determining apparatus. The apparatus includes function modules configured to perform the operations in the foregoing method. For example, as shown in FIG. 5, the apparatus includes an obtaining unit 201 and a processing unit 202. During actual application, other units/modules may be further configured according to actual needs.

Specifically, the obtaining unit 201 is configured to obtain startpoint information and endpoint information of a required path, where the startpoint information includes a sequence number of a startpoint POD and a sequence number of a startpoint edge switch, and the endpoint information includes a sequence number of an endpoint POD and a sequence number of an endpoint edge switch. The processing unit 202 is configured to: determine, from an n-dimensional Latin square, an element whose row is the sequence number of the startpoint edge switch and column is the sequence number of the endpoint edge switch, where n is a quantity of edge switches in each POD, an element in the n-dimensional Latin square is corresponding to an aggregation switch in each POD, and n is an integer greater than 2; and if the sequence number of the startpoint POD is the same as the sequence number of the endpoint POD, determine that the required path is the startpoint edge switch, an aggregation switch corresponding to the element in the POD, and the endpoint edge switch.

Optionally, the processing unit 202 is further configured to: if the sequence number of the startpoint POD is different from the sequence number of the endpoint POD, determine one of core switches connected to the aggregation switch corresponding to the element, where different startpoint edge switches in a same POD are corresponding to different core switches; and determine that the required path is the startpoint edge switch, the aggregation switch corresponding to the element in the POD, the one of the core switches connected to the aggregation switch, an aggregation switch connected to the core switch in the endpoint POD, and the endpoint edge switch.

Optionally, the processing unit 202 is configured to determine, from an n-dimensional arrangement vector, an element whose sequence number is the same as the sequence number of the startpoint edge switch, where a core switch corresponding to the element with the same sequence number is the one of the core switches, and elements in the n-dimensional arrangement vector are different from each other and each indicate one core switch in a core group connected to the aggregation switch.

Optionally, the processing unit 202 is further configured to: if a data flow is from the startpoint edge switch to the endpoint switch, determine, from a 2n-dimensional Latin square whose diagonal elements are the same, a wavelength element whose row is the sequence number of the startpoint POD and column is the sequence number of the endpoint POD, where elements in the 2n-dimensional Latin square whose diagonal elements are the same are corresponding to 2n optical carriers with different optical wavelengths; and determine that an optical carrier corresponding to the wavelength element is an optical carrier used for the required path.

Optionally, the processing unit 202 is further configured to: if a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, where elements in the $2n^3$-dimensional Latin square whose diagonal elements are the same are corresponding to $2n^3-1$ optical carriers with different optical wavelengths; and determine that an optical carrier corresponding to the wavelength element is an optical carrier used for the required path.

Various variations and specific instances in the route determining method in the foregoing embodiment are also applicable to the apparatus in this embodiment and the communications device in FIG. 2. According to the foregoing detailed descriptions of the route determining method, a person skilled in the art may clearly know implementation methods of the apparatus in this embodiment and the communications device in FIG. 2. Therefore, for conciseness of this specification, details are not described herein.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a magnetic disk storage, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing specified functions in one or more processes in the flowcharts and/or in one or more blocks in the block diagrams.

Alternatively, the computer program instructions may be stored in a computer readable memory that can instruct the computer or another programmable data processing device to work in a specific manner, so that the instructions stored in the computer readable memory generate an artifact that includes an instruction apparatus. The instruction apparatus implements specified functions in one or more processes in the flowcharts and/or in one or more blocks in the block diagrams.

Alternatively, the computer program instructions may be loaded onto a computer or another programmable data processing device, so that a series of operations and operations are performed on the computer or the another programmable device, to generate computer-implemented processing. Therefore, the instructions executed on the computer or the another programmable device provide operations for implementing specified functions in one or more processes in the flowcharts and/or in one or more blocks in the block diagrams.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A route determining method, comprising:
    obtaining startpoint information and endpoint information of a required path, wherein the startpoint information comprises a sequence number of a startpoint performance optimization datacenter (POD) and a sequence number of a startpoint edge switch, and the endpoint information comprises a sequence number of an endpoint POD and a sequence number of an endpoint edge switch;
    determining, from an n-dimensional Latin square, an element whose row number is the sequence number of the startpoint edge switch and column is the sequence number of the endpoint edge switch, wherein n is a quantity of edge switches in each POD, an element in the n-dimensional Latin square is corresponding to an aggregation switch in each POD, and n is an integer greater than 2; and
    when the sequence number of the startpoint POD is the same as the sequence number of the endpoint POD, determining the required path is the startpoint edge switch, an aggregation switch corresponding to the element in the POD, and the endpoint edge switch.

2. The method according to claim 1, further comprising:
    when the sequence number of the startpoint POD is different from the sequence number of the endpoint POD, determining a one of a plurality of core switches connected to the aggregation switch corresponding to the element, wherein different startpoint edge switches in a same POD are corresponding to different core switches; and
    determining the required path is the startpoint edge switch, the aggregation switch corresponding to the element in the startpoint POD, the determined core switch connected to the aggregation switch, another aggregation switch connected to the determined core switch in the endpoint POD, and the endpoint edge switch.

3. The method according to claim 2, wherein determining a one of a plurality of core switches connected to the aggregation switch corresponding to the element comprises:
    determining, from an n-dimensional arrangement vector, an element whose sequence number is the same as the sequence number of the startpoint edge switch, wherein a core switch corresponding to the element with the same sequence number is the determined one of the plurality of core switches, and elements in the n-dimensional arrangement vector are different from each other and each indicate one core switch in a core group connected to the aggregation switch.

4. The method according to claim 1, wherein when a data flow is from the startpoint edge switch to the endpoint edge switch, the method further comprises:
    determining, from a 2n-dimensional Latin square whose diagonal elements are the same, a wavelength element whose row is the sequence number of the startpoint POD and column is the sequence number of the endpoint POD, wherein elements in the 2n-dimensional Latin square whose diagonal elements are the same are corresponding to 2n optical carriers with different optical wavelengths; and
    determining that an optical carrier corresponding to the wavelength element is an optical carrier used for the required path.

5. The method according to claim 1, wherein when a data flow is from a startpoint host connected to the startpoint edge switch to an endpoint host connected to the endpoint edge switch, the method further comprises:
    determining, from a $2n^3$-dimensional Latin square whose diagonal elements are the same, a wavelength element whose row is the sequence number of the startpoint POD and column is the sequence number of the endpoint POD, wherein elements in the $2n^3$-dimensional Latin square whose diagonal elements are the same are corresponding to $2n^3-1$ optical carriers with different optical wavelengths; and
    determining that an optical carrier corresponding to the wavelength element is an optical carrier used for the required path.

6. A communications device, comprising:
a processor, configured to:
  obtain startpoint information and endpoint information of a required path, wherein the startpoint information comprises a sequence number of a startpoint performance optimization datacenter (POD) and a sequence number of a startpoint edge switch, and the endpoint information comprises a sequence number of an endpoint POD and a sequence number of an endpoint edge switch,
  determine, from an n-dimensional Latin square, an element whose row is the sequence number of the startpoint edge switch and column is the sequence number of the endpoint edge switch, wherein n is a quantity of edge switches in each POD, an element in the n-dimensional Latin square is corresponding to an aggregation switch in each POD, and n is an integer greater than 2, and
  when the sequence number of the startpoint POD is the same as the sequence number of the endpoint POD, determine the required path is the startpoint edge switch, an aggregation switch corresponding to the element in the POD, and the endpoint edge switch; and
a transmitter, configured to send the required path to a switch at each layer in a datacenter network.

7. The communications device according to claim 6, wherein the processor is further configured to:
  when the sequence number of the startpoint POD is different from the sequence number of the endpoint POD, determine a one of a plurality of core switches connected to the aggregation switch corresponding to the element, wherein different startpoint edge switches in a same POD are corresponding to different core switches; and
  determine the required path is the startpoint edge switch, the aggregation switch corresponding to the element in the startpoint POD, the determined core switch, another aggregation switch connected to the determined core switch in the endpoint POD, and the endpoint edge switch.

8. The communications device according to claim 7, wherein the processor is configured to:
  determine, from an n-dimensional arrangement vector, an element whose sequence number is the same as the sequence number of the startpoint edge switch, wherein a core switch corresponding to the element with the same sequence number is the determined one of the plurality of core switches, and elements in the n-dimensional arrangement vector are different from each other and each indicate one core switch in a core group connected to the aggregation switch.

9. The communications device according to claim 6, wherein the processor is further configured to:
  when a data flow is from the startpoint edge switch to the endpoint edge switch, determine, from a 2n-dimensional Latin square whose diagonal elements are the same, a wavelength element whose row is the sequence number of the startpoint POD and column is the sequence number of the endpoint POD, wherein elements in the 2n-dimensional Latin square whose diagonal elements are the same are corresponding to 2n optical carriers with different optical wavelengths; and
  determine that an optical carrier corresponding to the wavelength element is an optical carrier used for the required path.

10. The communications device according to claim 6, wherein the processor is further configured to:
  when a data flow is from a startpoint host connected to the startpoint edge switch to an endpoint host connected to the endpoint edge switch, determine, from a $2n^3$-dimensional Latin square whose diagonal elements are the same, a wavelength element whose row is the sequence number of the startpoint POD and column is the sequence number of the endpoint POD, wherein elements in the $2n^3$-dimensional Latin square whose diagonal elements are the same are corresponding to $2n^3-1$ optical carriers with different optical wavelengths; and
  determine that an optical carrier corresponding to the wavelength element is an optical carrier used for the required path.

* * * * *